*(12)* United States Patent
Bernatchez et al.

(10) Patent No.: US 12,525,815 B2
(45) Date of Patent: Jan. 13, 2026

(54) DISTRIBUTED BATTERY MANAGEMENT SYSTEM FOR ELECTRIC VEHICLE

(71) Applicant: TAIGA MOTORS INC., Lasalle (CA)

(72) Inventors: Gabriel Bernatchez, Montreal (CA); Marc-Olivier Gagnon, Montreal (CA)

(73) Assignee: TAIGA MOTORS INC., Lasalle (CA)

( * ) Notice: Subject to any disclaimer, the term of this patent is extended or adjusted under 35 U.S.C. 154(b) by 0 days.

(21) Appl. No.: 17/565,557

(22) Filed: Dec. 30, 2021

(65) Prior Publication Data

US 2022/0224139 A1 Jul. 14, 2022

Related U.S. Application Data

(60) Provisional application No. 63/135,452, filed on Jan. 8, 2021.

(51) Int. Cl.
*H01M 50/509* (2021.01)
*B60L 50/60* (2019.01)
(Continued)

(52) U.S. Cl.
CPC ........ *H02J 7/007182* (2020.01); *B60L 50/64* (2019.02); *B60L 50/66* (2019.02);
(Continued)

(58) Field of Classification Search
CPC ............. H02J 7/007182; H02J 7/00032; H02J 7/0013; H01M 10/425; H01M 10/482;
(Continued)

(56) References Cited

U.S. PATENT DOCUMENTS 8,264,204 B2 9/2012 Nagaoka et al.
2011/0049977 A1 3/2011 Onnerud
(Continued)

FOREIGN PATENT DOCUMENTS

CN 102481858 A 11/2014
CN 105518476 A 4/2016
(Continued)

OTHER PUBLICATIONS

European Patent Office, Communication re: extended European search report in European patent application No. 21217734.9, Jun. 7, 2022.
(Continued)

*Primary Examiner* — Rexford N Barnie
*Assistant Examiner* — Swarna N Chowdhuri
(74) *Attorney, Agent, or Firm* — Norton Rose Fulbright Canada LLP

(57) ABSTRACT

A distributed battery management system for a multi-module traction battery pack of an electric vehicle is provided. The battery management system comprises an analog-to-digital converter (ADC) integrated into a battery module of the traction battery pack of the electric vehicle, and a master controller external to the battery module and in digital data communication with the ADC. The ADC converts an analog signal indicative of a sensed voltage associated with one or more cells of the battery module into a digital signal indicative of the sensed voltage. The master controller performs a function associated with the traction battery pack of the electric vehicle based on the sensed voltage.

21 Claims, 9 Drawing Sheets

(51) Int. Cl.
| | |
|---|---|
| B60L 50/64 | (2019.01) |
| B60L 58/10 | (2019.01) |
| B60L 58/18 | (2019.01) |
| H01M 10/42 | (2006.01) |
| H01M 10/48 | (2006.01) |
| H02J 7/00 | (2006.01) |

(52) U.S. Cl.
CPC ....... *H01M 10/425* (2013.01); *H01M 10/482* (2013.01); *H02J 7/00032* (2020.01); *H02J 7/0013* (2013.01); *B60L 2200/12* (2013.01); *B60L 2200/32* (2013.01); *H01M 2010/4271* (2013.01); *H01M 2220/20* (2013.01)

(58) Field of Classification Search
CPC ..... H01M 2010/4271; H01M 2220/20; H01M 50/519
USPC .......................................... 307/118
See application file for complete search history.

(56) References Cited

U.S. PATENT DOCUMENTS

| | | | |
|---|---|---|---|
| 2014/0045630 A1* | 2/2014 | Perkins | G01P 1/02 473/570 |
| 2020/0119408 A1 | 4/2020 | Kim et al. | |
| 2020/0140037 A1 | 5/2020 | Haavikko et al. | |
| 2020/0274203 A1* | 8/2020 | Kirleis | B64D 27/24 |
| 2022/0009589 A1 | 1/2022 | Matsushita | |
| 2022/0017181 A1 | 1/2022 | Suzuki et al. | |
| 2022/0063764 A1 | 3/2022 | Matsushita | |
| 2022/0111929 A1 | 4/2022 | Matsushita | |

FOREIGN PATENT DOCUMENTS

| | | |
|---|---|---|
| CN | 105518901 A | 4/2016 |
| KR | 20200040533 A | 4/2020 |
| RU | 130066 U1 * | 7/2013 |
| WO | 2021084520 A2 | 5/2021 |

OTHER PUBLICATIONS

Weberauto, 2018 Chevrolet Volt 355.2V Li-Ion Battery—Deep Dive, https://www.youtube.com/watch?=veWYtq0hxhQg, Dated Dec. 11, 2017, accessed on Nov. 12, 2021.

Wikipedia, Battery Management System, https://en.wikipedia.org/w/index.php?title=Battery_management_system&oldid=1051773739, accessed on Oct. 25, 2021.

Tecmundo, MediaTek explica como a bateria de um celular pode explodir, https://www.tecmundo.com.br/bateria/109856-mediatek-explica-bateria-celular-explodir.htm?utm_campaign=ultimasnoticias&utm_medium=internas&u . . . , Sep. 23, 2016.

EVTV Motor Verks, Tesla Model 3 Battery Removal and Dissasembly, https://www.youtube.com/watch?v=PvCOcBynlq0&t=587s&ab_channel=EVTVMotors, Dated May 13, 2018; Accessed on Nov. 12, 2021.

Yashorath, Yashorath Battery Management System, Yashorath Electronic Systems, https://5.imimg.com/data5/LS/UE/MY-12619246/battery-monitoring-system.pdf, accessed on Nov. 12, 2021.

* cited by examiner

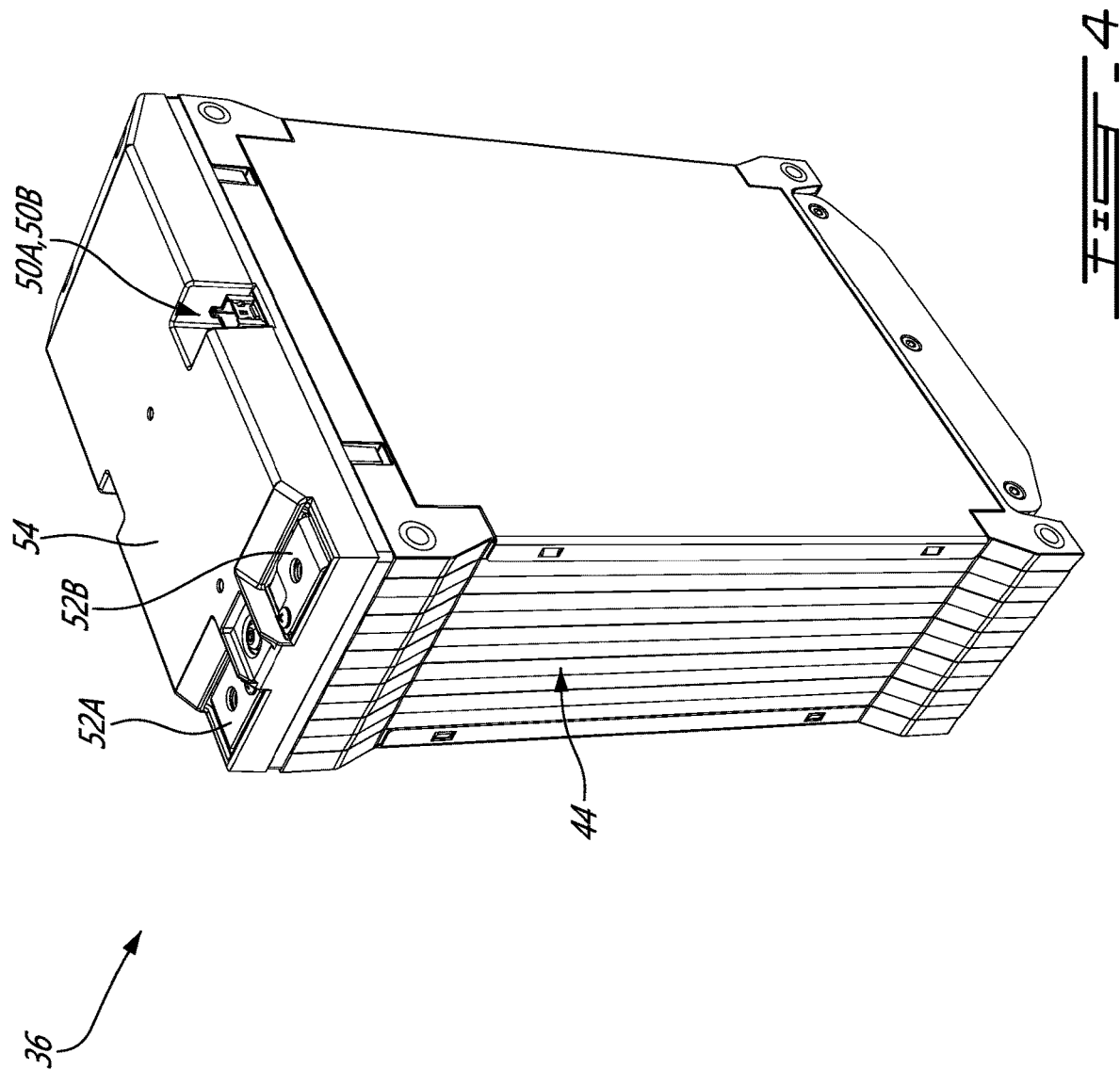

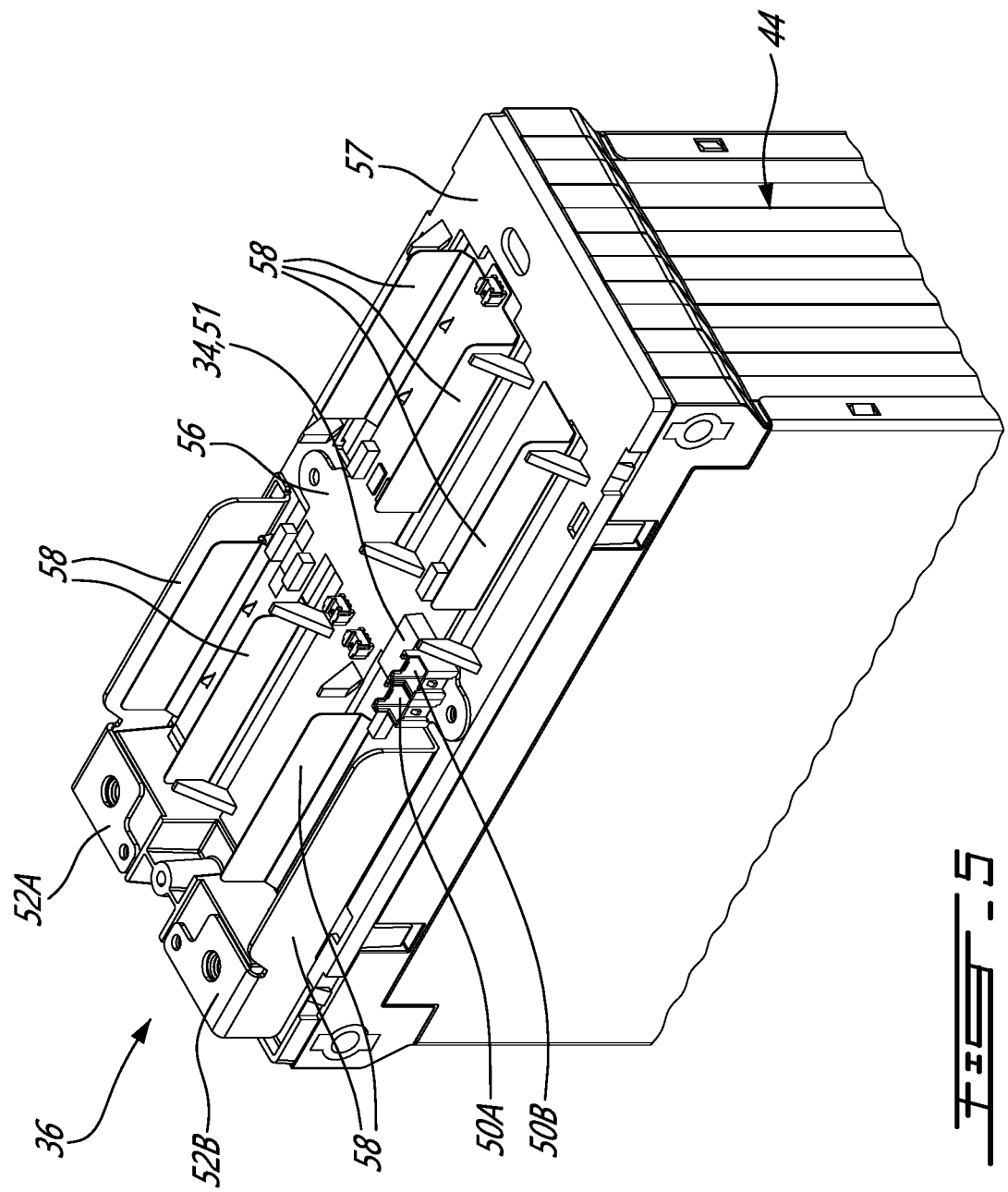

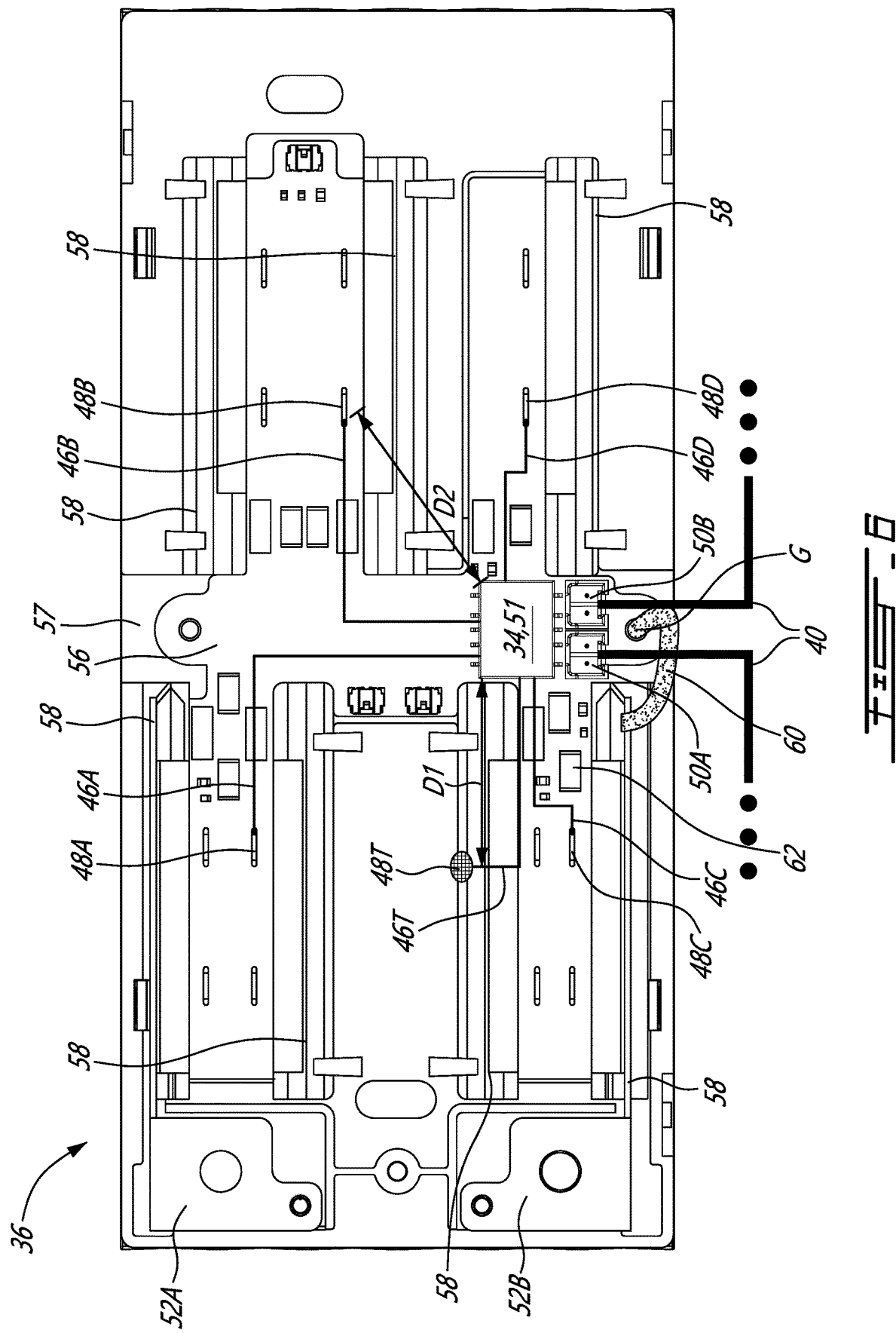

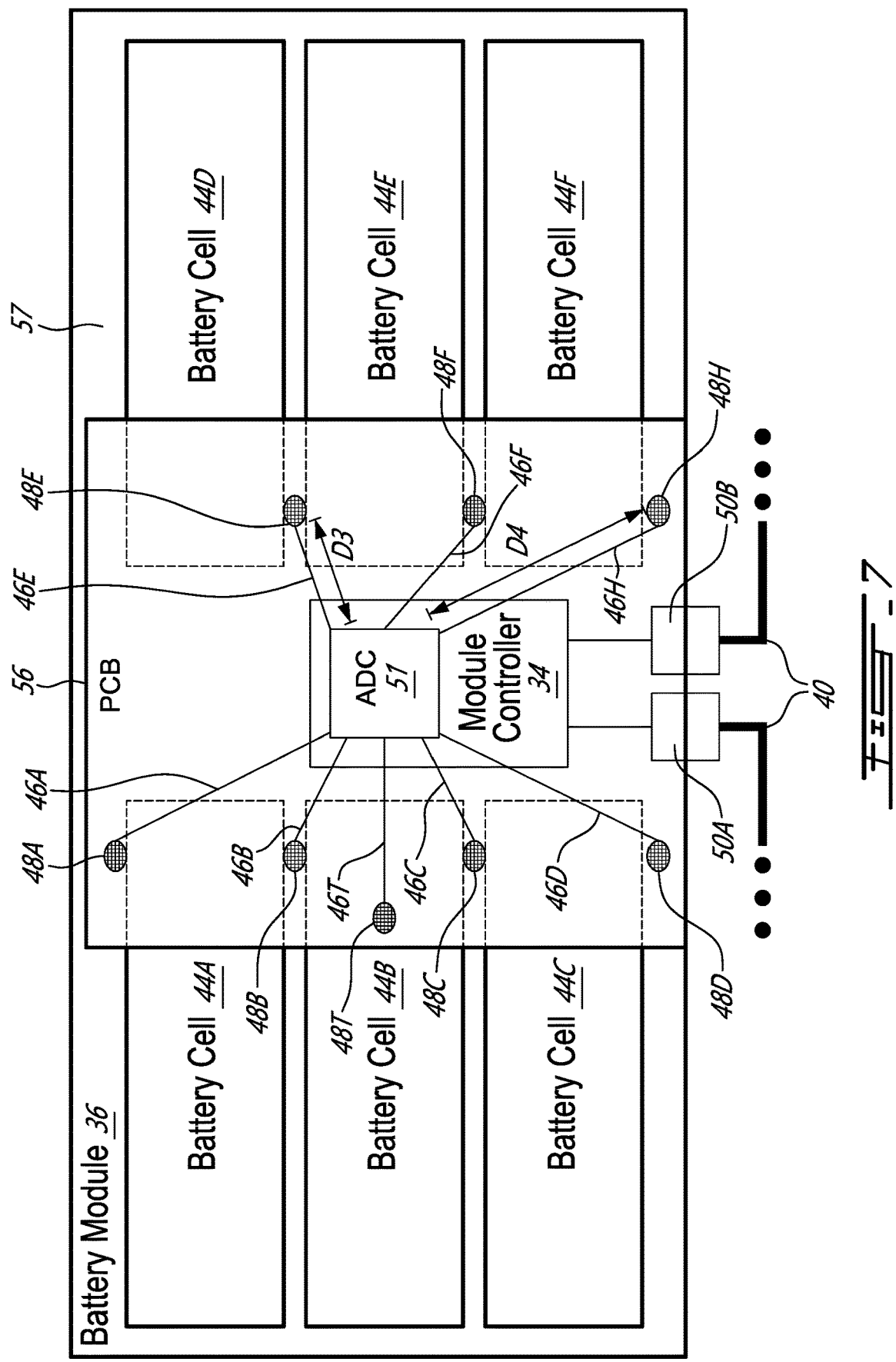

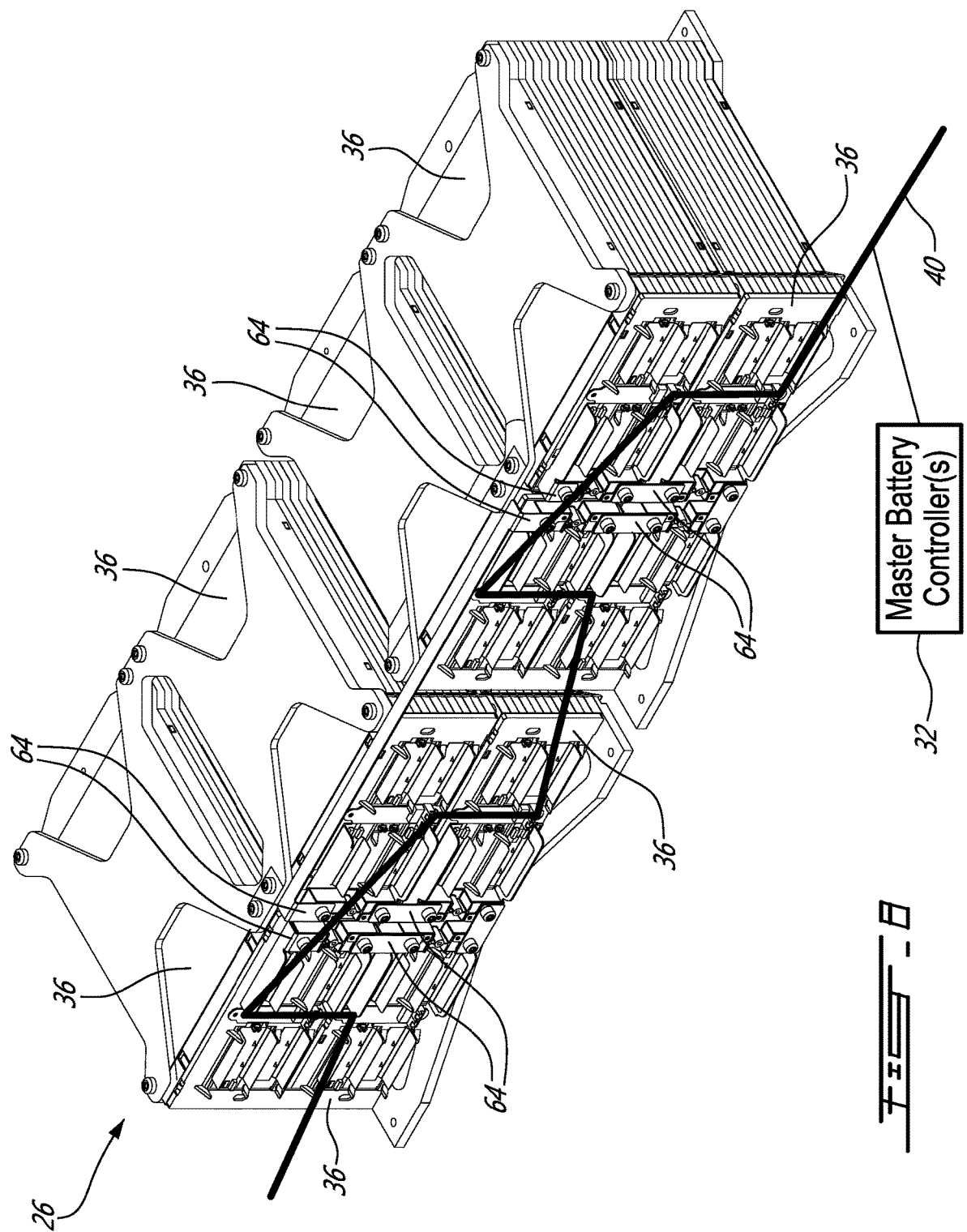

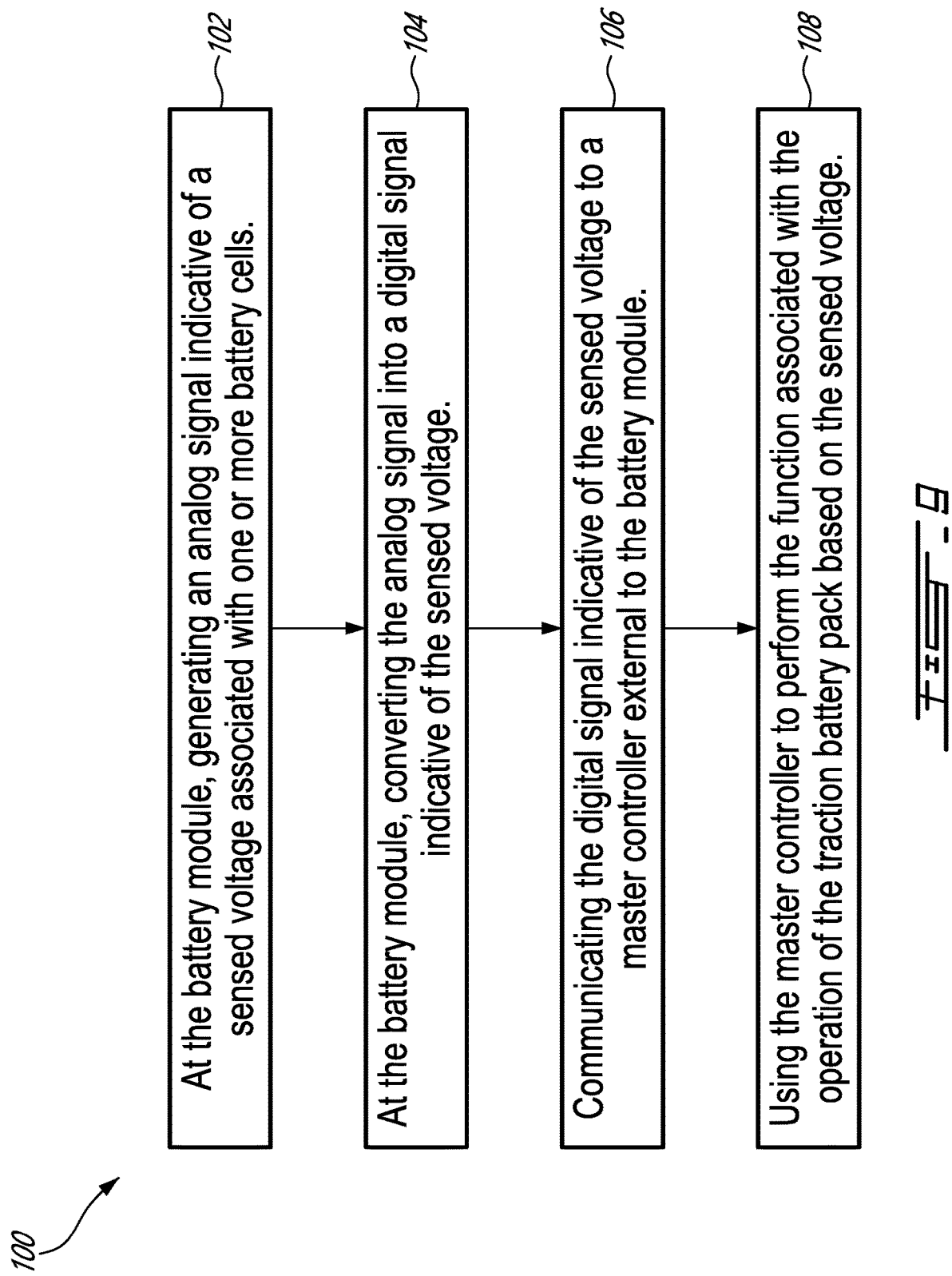

DISTRIBUTED BATTERY MANAGEMENT SYSTEM FOR ELECTRIC VEHICLE

CROSS REFERENCE TO RELATED APPLICATION AND CLAIM OF PRIORITY

The present application claims priority to U.S. Provisional Patent Application No. 63/135,452 filed on Jan. 8, 2021, the entire contents of which are hereby incorporated herein by reference.

TECHNICAL FIELD

The disclosure relates generally to electric vehicles, and more particularly to battery management systems of electric vehicles.

BACKGROUND

Electric vehicles can include a battery pack having a plurality of battery modules that are each connected to a central battery management system (BMS). The BMS receives sensed parameters from the battery modules and uses the sensed parameters as inputs to control the operation of the battery pack. For example, the BMS is responsible for making sure the battery is operating within its safe operating conditions, for monitoring the battery's state of charge (SoC) and state of health (SoH), and for balancing the operation of the battery cells within each battery module, among other functions. To promote safe and efficient control of the battery pack, it is important that the BMS receives reliable sensed parameters from the battery modules.

SUMMARY

In one aspect, the disclosure describes a battery module comprising:
a plurality of battery cells; and
an integrated battery module controller, the integrated battery module controller comprising an analog-to-digital converter and at least one connector for connecting to tabs of the plurality of battery cells, wherein a distance between the analog-to-digital converter and the at least one connector is between 20-100 mm,
wherein the integrated battery module controller is in signal communication with a master battery management controller located remotely from the battery module.

The battery module may further comprise a grouping of battery cell tabs, the grouping comprising battery cell tabs of at least two battery cells of the plurality of battery cells, wherein the at least one connector connects to the grouping of battery cell tabs.

The distance between the analog-to-digital converter and the at least one connector may be between 35-60 mm.

The distance between the analog-to-digital converter and the at least one connector may be between 40-50 mm.

The plurality of battery cells may comprise greater than 4 battery cells.

The plurality of battery cells may comprise 12 battery cells.

The at least one connector may comprise 7 connectors. The distance between the analog-to-digital converter and each of the 7 connectors may be between 20-100 mm.

The battery module may comprise a thermistor. A distance between the analog-to-digital converter and the thermistor may be less than 100 mm.

The plurality of battery cells may be a plurality of battery pouch cells.

The integrated battery module controller may be coupled to a face of the battery module.

Embodiments may include combinations of the above features.

In another aspect, the disclosure describes an electric vehicle comprising:
two battery modules each comprising a plurality of battery cells;
a modular distributed battery management system comprising:
a central battery management controller located remotely from the two battery modules; and
two integrated battery module controllers, each coupled to a respective one the two battery modules;
wherein each integrated battery module controller comprises an analog-to-digital converter and at least one connector for connecting to tabs of the plurality of battery cells of its respective battery module; and
wherein a distance between the analog-to-digital converter and the at least one connector is between 20-100 mm.

The two integrated battery module controllers may be daisy chained together.

In some embodiments, each battery module may comprise a prismatic enclosure containing its respective plurality of battery cells.

The battery modules may be arranged in a stack.

Embodiments may include combinations of the above features.

In another aspect, the disclosure describes a distributed battery management system for a multi-module traction battery pack of an electric vehicle. The distributed battery management system comprises:
an analog-to-digital converter (ADC) integrated into a battery module of the traction battery pack of the electric vehicle, the ADC converting an analog signal indicative of a sensed voltage associated with one or more cells of the battery module into a digital signal indicative of the sensed voltage; and
a master controller that performs a function associated with the traction battery pack of the electric vehicle based on the sensed voltage, the master controller being external to the battery module and in digital data communication with the ADC to receive the digital signal indicative of the sensed voltage from the ADC.

The battery module may be a first battery module. The ADC may be part of a first module controller integrated into the first battery module. The distributed battery management system may include a second module controller integrated into a second battery module of the traction battery pack of the electric vehicle. The first module controller and the second module controller may be connected together in a daisy chain manner.

The master controller may be in digital data communication with both the first module controller and the second module controller via a controller area network (CAN) bus.

The distributed battery management system may comprise a printed circuit board on which the ADC is installed. The printed circuit board may define an electric conductor establishing electric communication from the ADC to a voltage sensing location associated with the one or more cells of the battery module. A length of the electric conductor may be less than or equal to 100 mm.

The one or more cells of the battery module may include a plurality of cells of the battery module. The ADC may be electrically connected to a plurality of voltage sensing locations associated with the plurality of cells of the battery module. The ADC may convert a plurality of analog signals indicative of respective sensed voltages at the plurality of voltage sensing locations into digital signals indicative of the respective sensed voltages.

Embodiments may include combinations of the above features.

In another aspect, the disclosure describes an electric powersport vehicle comprising a distributed battery management system as disclosed herein.

In another aspect, the disclosure describes a line-replaceable battery module of a multi-module traction battery pack of an electric vehicle. The line-replaceable battery module comprises:

one or more battery cells;
a module controller converting an analog signal indicative of a sensed voltage associated with the one or more battery cells of the line-replaceable battery module into a digital signal indicative of the sensed voltage; and
a digital communication interface for communicating the digital signal indicative of the sensed voltage externally of the line-replaceable battery module.

The line-replaceable battery module may comprise a cover covering tabs associated with the one or more battery cells. The cover may also cover the module controller.

The line-replaceable battery module may comprise a printed circuit board on which the module controller is installed. The printed circuit board may define an electric conductor establishing electric communication from the module controller to a voltage sensing location associated with the one or more cells of the battery module. A length of the electric conductor may be less than or equal to 100 mm.

The one or more battery cells may include six or more battery cells.

The line-replaceable battery module may comprise a printed circuit board on which the module controller is installed. The printed circuit board may define electric conductors establishing electric communication from the module controller to voltage sensing locations associated with the six or more cells of the line-replaceable battery module. A length of each electric conductor may be less than or equal to 100 mm.

Embodiments may include combinations of the above features.

In another aspect, the disclosure describes a method of performing a function associated with an operation of a traction battery pack of an electric vehicle. The method comprises:

at the battery module: generating an analog signal indicative of a sensed voltage associated with the one or more battery cells; and converting the analog signal into a digital signal indicative of the sensed voltage;
communicating the digital signal indicative of the sensed voltage to a master controller external to the battery module; and
using the master controller to perform the function associated with the operation of the traction battery pack based on the sensed voltage.

The method may comprise converting the analog signal into the digital signal at a distance of less than or equal to 100 mm from a voltage sensing location used to generate the analog signal.

The analog signal may be a first analog signal indicative of a first sensed voltage associated with a first of the one or more battery cells. The digital signal may be a first digital signal indicative of the first sensed voltage. The method may include, at the battery module:

generating a second analog signal indicative of a second sensed voltage associated with a second of the one or more battery cells;
converting the first analog signal into the first digital signal at a first distance of less than or equal to 100 mm from a first voltage sensing location used to generate the first analog signal; and
converting the second analog signal into a second digital signal indicative of the second sensed voltage at a second distance of less than or equal to 100 mm from a second voltage sensing location used to generate the second analog signal.

The method may comprise:
communicating the second digital signal indicative of the second sensed voltage to the master controller; and
using the master controller, performing the function associated with the operation of the traction battery pack based on the first sensed voltage and the second sensed voltage.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 4 is a perspective view of an exemplary multi-cell battery module of the battery pack of the vehicle of FIG. 1;

FIG. 5 is a perspective view of part of the multi-cell battery module of FIG. 4 with a cover thereof being removed;

FIG. 6 is a top plan view of the multi-cell battery module of FIG. 4 with the cover removed;

FIG. 7 is a schematic top plan view of the multi-cell battery module of FIG. 4;

FIG. 8 is a perspective view of an exemplary battery pack including a plurality of multi-cell battery modules of FIG. 4; and FIG. 9 is a flowchart of a method of monitoring a voltage of a battery cell of a battery module of an electric vehicle.

DETAILED DESCRIPTION

Figure 1:
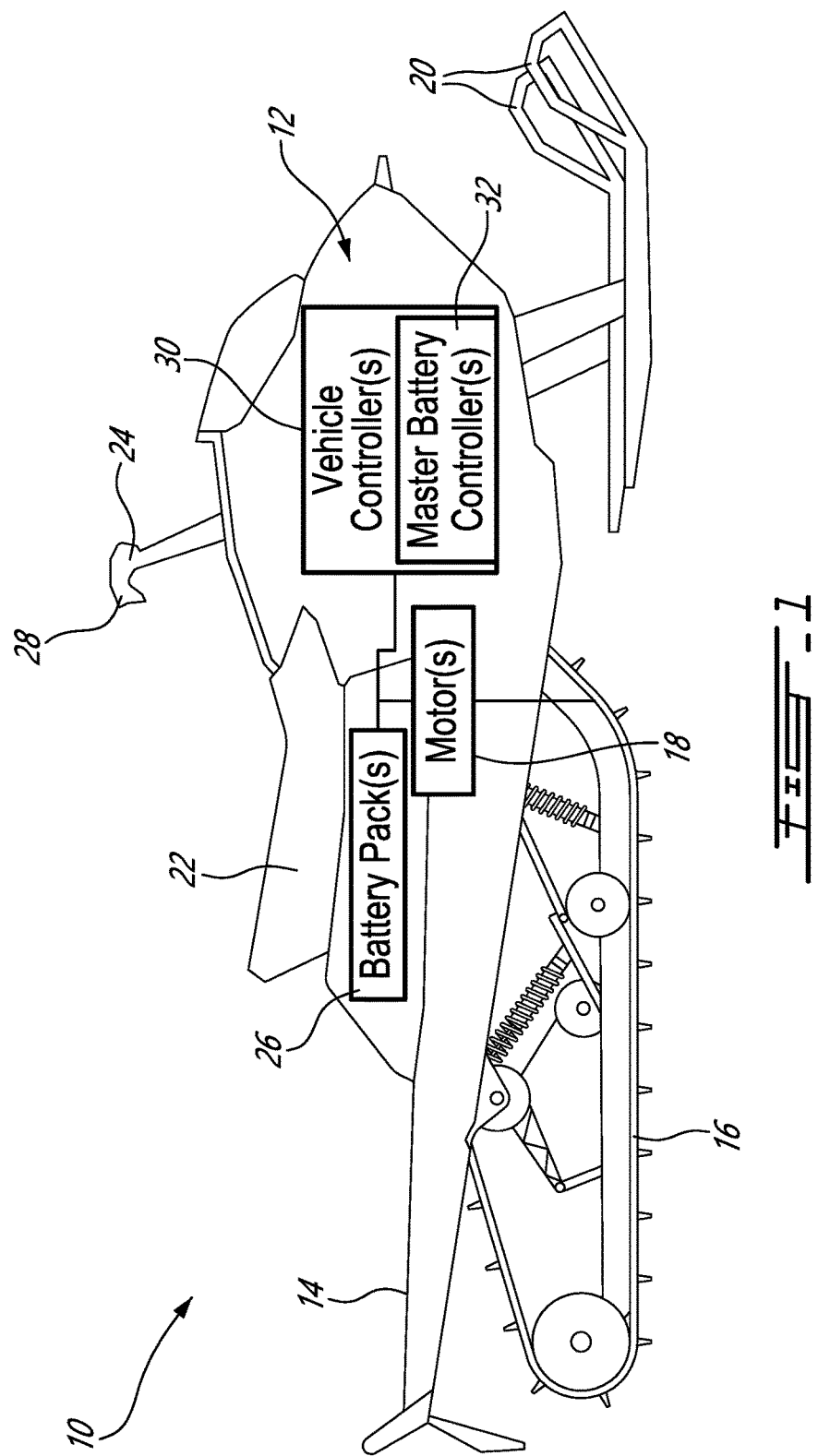
FIG. 1 is a schematic representation of an exemplary electric vehicle including a battery management system as described herein.

The following disclosure describes battery management systems (BMSs) and associated components and methods for electric vehicles. In some embodiments, the systems and methods described herein may be particularly suitable for electric powersport vehicles. Examples of suitable electric powersport vehicles include snowmobiles, motorcycles, watercraft such as boats and personal watercraft (PWCs), all-terrain vehicles (ATVs), and (e.g., side-by-side) utility task vehicles (UTVs). In some embodiments, the systems and methods described herein may facilitate the control and operation of a traction battery pack by promoting a high reliability and accuracy of sensed parameters (e.g., voltage(s) and temperature(s)) associated with cells of battery modules of such traction battery packs. In some embodiments, the systems and methods described herein may promote reduced wiring between battery modules and a master battery management controller for the traction battery pack.

In electric vehicles implementing a centralized BMS, where each battery module of a battery pack is associated with a small module controller located on a printed circuit board (PCB) at a central battery management controller located remotely of the battery modules, the module controller obtains analog readings of voltage and temperature for one or more battery cells within the battery module. Each battery module may be connected via several wires to this small controller resulting in a relatively large number of wires that run relatively long distances from each battery module to its respective module controller at the central battery management controller. A failure of any part (e.g., a module controller or connector) located at the central battery management controller PCB may require replacement and reconnection of the entire PCB. In addition, replacement of a battery module may require rewiring of the battery module to the central battery management controller. Further, transmitting analog signals over longer electric conductors can increase the risk of signal loss (e.g., voltage drop) and/or signal noise affecting the accuracy of the analog signals.

In contrast with a centralized BMS, a distributed BMS as described herein may include a module controller associated and integrated with each battery module, and in digital data communication with a master battery management controller that controls an operation of the battery pack based on one or more sensed parameters (e.g., voltage, temperature) that are communicated from the module controller(s) to the master battery management controller in digital form. In some embodiments, a single module controller may be configured to perform analog-to-digital conversions of one or more parameters associated with the battery cells of its battery module. A suitable data bus may be used to communicate the sensed parameters from one or from a plurality of module controllers to the master battery management controller. Accordingly, the architecture of the distributed BMS described herein may, in some embodiments, promote reduced cost, reduced wiring, reduced part count, and/or reduced complexity. In some embodiments, the distributed BMS may improve the modularity of the battery pack, as battery modules may be more easily connected to, and disconnected from, the distributed BMS as compared to a centralized BMS. Also, the proximity of the module controllers to the tabs or to other (e.g., voltage, temperature) sensing locations of the battery cells may also promote accuracy and reliability of the sensed voltages and/or of other sensed parameters. This in turn may promote efficient control of the battery pack by reducing the risk of signal loss and/or signal noise that may be otherwise associated with analog signals that are transmitted over longer electric conductors.

The term "connected" and "coupled" may include both direct connection and coupling (in which two elements contact each other) and indirect connection and coupling (in which at least one additional element is located between the two elements). The term "connected" also includes electrical connections.

The term "substantially" as used herein may be applied to modify any quantitative representation which could permissibly vary without resulting in a change in the basic function to which it is related.

Aspects of various embodiments are described through reference to the drawings.

FIG. 1 is a schematic representation of an exemplary electric powersport vehicle 10 (referred hereinafter as "vehicle 10") including battery management system 12 (referred hereinafter as "BMS 12") as described herein. As illustrated in FIG. 1, vehicle 10 may be a snowmobile but it is understood that the systems described herein may also be used on other types of electric vehicles such as electric UTVs, electric ATVs, electric PWCs, electric motorcycles, boats having electric outboard motors, and other electric powersport vehicles. In some embodiments, vehicle 10 may be an electric snowmobile including elements of the snow vehicle described in International Patent Publication No. WO 2019/049109 A1 (Title: BATTERY ARRANGEMENT FOR ELECTRIC SNOW VEHICLES), and U.S. Patent Application No. 63/135,497 (Title: ELECTRIC VEHICLE WITH BATTERY PACK AS STRUCTURAL ELEMENT) which are incorporated herein by reference.

Vehicle 10 may include a frame (also known as a chassis) which may include tunnel 14, track 16 having the form of an endless belt for engaging the ground and disposed (i.e., located) under tunnel 14, one or more electric motors 18 (referred hereinafter in the singular) mounted to the frame and configured to drive track 16, left and right skis 20 disposed in a front portion of vehicle 10, straddle seat 22 disposed above tunnel 14 for accommodating an operator of vehicle 10 and optionally one or more passengers (not shown). Skis 20 may be movably attached to the frame to permit steering of vehicle 10 via a steering assembly including a steering column interconnecting handlebar 24 with skis 20.

Motor 18 may be drivingly coupled to track 16 via a drive shaft. Electric motor 18 may be in torque-transmitting engagement with the drive shaft via a belt/pulley drive. However, motor 18 may be in torque-transmitting engagement with the drive shaft via other arrangements such as a chain/sprocket drive, or shaft/gear drive for example. The drive shaft may be drivingly coupled to track 16 via one or more toothed wheels or other means so as to transfer motive power from motor 18 to track 16.

In various embodiments, motor 18 may be a permanent magnet synchronous motor or a brushless direct current motor for example. In some embodiments, motor 18 may have a power output rating of between 120 and 180 horsepower, or motor 18 may have a maximum output power rating of greater than 180 horsepower, for example. Motor 18 may be of a same type as, or may include elements of, the motors described in U.S. Provisional Patent Application No. U.S. 63/135,466 (Title: DRIVE UNIT FOR ELECTRIC VEHICLE) and U.S. Provisional Patent Application no. U.S. 63/135,474 (Title: DRIVE UNIT WITH FLUID PATHWAYS FOR ELECTRIC VEHICLE), which are both incorporated herein by reference. In some embodiments, multiple motors may be implemented to drive vehicle 10.

Vehicle 10 may also include one or more brakes that may be applied or released by an actuation of a suitable brake actuator (e.g., lever) by the operator for example. In various embodiments, the brake(s) may include a friction-type brake including a master cylinder hydraulically connected to a brake caliper that forces brake pads against a brake rotor or disk that is coupled to a powertrain of vehicle 10. Actuation of the brake actuator (e.g. lever) may cause a combination of friction braking and regenerative braking. Regenerative braking may also be applied in isolation, i.e., without friction braking. In some embodiments, regenerative braking may be used such that battery pack(s) 26 (referred hereinafter in the singular) of vehicle 10 is supplied with electric energy generated by motor 18 operating as a generator when the brake actuator is applied, and/or when the operator releases accelerator 28.

Battery pack 26 may provide electric power to motor 18 for driving motor 18 when vehicle 10 is being propelled by motor 18. Battery pack 26 may be a main battery pack used for propelling vehicle 10. In other words, battery pack 26 may also be referred to as a "motoring" or "traction" battery pack. Battery pack 26 may be located under seat 22. In some embodiments, battery pack 26 may be a rechargeable multi-module, multi-cell lithium ion battery pack as explained further below. The battery cells of battery pack 26 may be pouch cells, cylindrical cells and/or prismatic cells, for example. Battery pack 26 may include a battery enclosure to house the battery modules and/or battery cells for protection from impacts, water and/or debris. In some embodiments, battery pack 26 may be configured to output electric power at a voltage of between 300-400 volts, or up to 800 volts, for example.

The operation of motor 18 and the delivery of electric power to motor 18 from battery pack 26 may be controlled by one or more vehicle controllers 30 based on an actuation of accelerator 28, also referred to as "throttle", by the operator. The delivery of electric power to motor 18 may be controlled via a suitable power electronics module, such as a power inverter (not shown), including electronic switches (e.g., insulated gate bipolar transistor(s)) to provide motor 18 with electric power having the desired voltage, current, waveform, etc. to implement the desired performance of vehicle 10. Vehicle controller(s) 30 may include one or more electronic control units (ECUs), or one or more electronic control modules (ECMs) in some embodiments. An example of an ECU or ECM is a motor controller, which may be or include a power inverter. Vehicle controller(s) 30 may include a computer including one or more data processors and non-transitory machine-readable memory storing instructions for execution by the one or more data processors. Vehicle controller(s) 30 may control, based on sensed and/or operator inputs, various aspects of vehicle 10.

Figure 2:
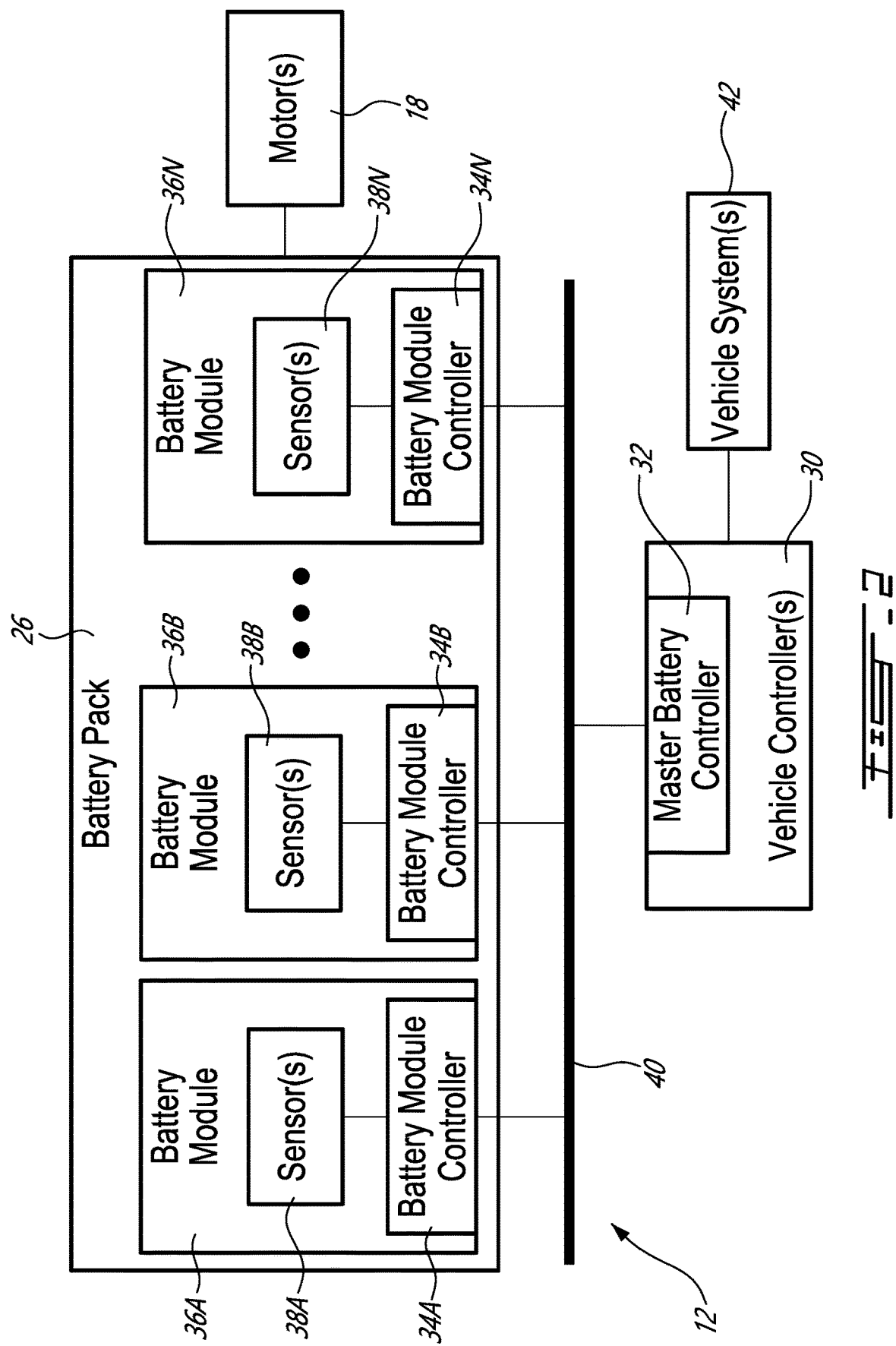
FIG. 2 is an exemplary schematic representation of the battery management system of the vehicle of FIG. 1.

Vehicle controller(s) 30 may include master battery management controller 32 (referred hereinafter as "master controller 32"), which may be part of BMS 12. Master controller 32 may be integrated with a control system of vehicle 10, as shown in FIG. 2 as being part of vehicle controller(s) 30. Alternatively, master controller 32 may be part of a stand-alone BMS 12 that is separate from a control system of vehicle 10. Vehicle controller(s) 30 may operate and communicate with one or more other systems 42 (shown in FIG. 2) of vehicle 10. For example, vehicle controller(s) 30 may be in communication with and optionally perform control functions associated with a steering system, motor 18, power management, and thermal management of vehicle 10 for example.

Master controller 32 may include a computer including one or more data processors and non-transitory machine-readable memory storing instructions for execution by the one or more data processors. Master controller 32 may also or instead include an application specific integrated circuit (ASIC) and/or a field programmable gate array (FPGA). Through the use of master controller 32 and one or more module controller(s) described below, BMS 12 may perform various monitoring and control functions associated with the operation of battery pack 26. BMS 12 may include any suitable electronic system that manages battery pack 26 or part(s) thereof. Examples of functions performed by BMS 12 may include protecting battery pack 26 from operating outside its safe operating zone (e.g., over current protection and monitoring the state of battery pack 26), calculating and reporting data (e.g., voltage, state of charge) associated with battery pack 26, controlling the environment in which battery pack 26 operates, authenticating battery pack 26, and/or balancing battery pack 26. BMS 12 may monitor the state of battery pack 26 as represented by parameters such as total voltage of battery pack 26, voltages of individual cells or groups of cells, average temperature, coolant intake temperature, coolant output temperature, temperatures of individual cells, coolant flow in embodiments where battery pack 26 is liquid-cooled or air-cooled, and/or current flowing in or out of battery pack 26 for example. BMS 12 may perform one or more control functions associated with battery pack 26 by the control/actuation of one or more switches to control a flow of electric current, and/or one or more valves to control a flow of coolant fluid. In some embodiments, BMS 12 may control a heater (not shown) to warm battery pack 26 when it is below a defined operating temperature. The heater may be implemented within a thermal management system to warm a coolant fluid.

FIG. 2 is a schematic representation of an exemplary distributed BMS 12 of vehicle 10. BMS 12 may include battery module controllers 34A-34N (referred generically herein as "module controllers 34") each associated and integrated with a respective battery module 36A-36N (referred generically herein as "battery modules 36") of battery pack 26. Battery modules 36 may be located within a common battery pack 26. Battery pack 26 may be operatively connected to supply electric power to motor 18 and optionally one or more other electric loads within vehicle 10. Battery pack 26 may include two or more battery modules 36. In some embodiments, battery pack 26 may include fourteen or more battery modules 36. In some embodiments, battery pack 26 may include sixteen battery modules 36. In some embodiments, battery modules 36 may be electrically daisy chained together in series for delivering electric power to motor 18, and optionally to other electric loads of vehicle 10.

In some embodiments, each module controller 34 may be operative to obtain sensed parameters such as voltage and temperature readings associated with one or more battery cells within its associated battery module 36. Each module controller 34 may be operatively connected to one or more sensors 38A-38N (e.g., thermistor(s), thermocouple(s), electric conductors, connectors and connections for voltage sensing), for the acquisition of one or more sensed parameters. In embodiments where a battery module 36 includes more than one temperature sensor, the readings from the multiple temperature sensors may be averaged at module controller 34 and the average temperature associated with the applicable battery module 36 may be communicated to master controller 32. Voltage readings may be acquired by, for example, electric conductors extending from module controller 34 to tabs of battery module 36 or to other voltage sensing locations as explained below.

Each integrated module controller 34 may be in digital data communication with master controller 32 via wireless or wired connections. In some embodiments, module controllers 34 may each be in digital data communication with master controller 32 via data bus 40. In various embodiments, data bus 40 may be a Controller Area Network (CAN) bus, or a suitable serial peripheral interface such as coupling circuitry known under the trade name isoSPI™ for example. Module controllers 34 may function as intermediaries that feed digital data indicative of sensed parameters to master controller 32. Module controllers 34 may also receive instructions from master controller 32 and, for example, cause the discharge of individual battery cells when instructed by master controller 32. In some embodiments, module controllers 34 may not execute control logic for controlling the operation of their respective battery modules 36. Module controllers 34 may each have built-in analog-to-digital converter (ADC) capabilities. Alternatively, battery modules 36 may each have an ADC that is external to and in data communication with module controllers 34. Module controllers 34 may each include or be a microcontroller such as a CAN controller that may store bits of data received from data bus 40 and also transmit bits serially onto data bus 40 when data bus 40 is free.

Master controller 32 may be integrated with battery pack 26 or may be disposed externally of battery pack 26. Master controller 32 may execute control and/or monitoring functions of BMS 12. For example, master controller 32 may aggregate the data received as digital signals from module controllers 34, and execute logic to control one or more operations associated with battery pack 26 such as directing the charging of battery cells, directing the discharging of battery cells, and/or directing other functions associated with battery pack 26. For example, temperature readings of cells or groups of cells may be used to control a cooling system delivering a cooling fluid to battery modules 36.

BMS 12 may have a distributed architecture where some (e.g., data acquisition and analog-to-digital conversion) functions may be performed locally at individual battery modules 36 using module controllers 34, and other (e.g., battery management and control) functions may be performed remotely of individual battery modules 36 using master controller 32. BMS 12 and battery pack 26 may each have a modular construction.

Figure 3:
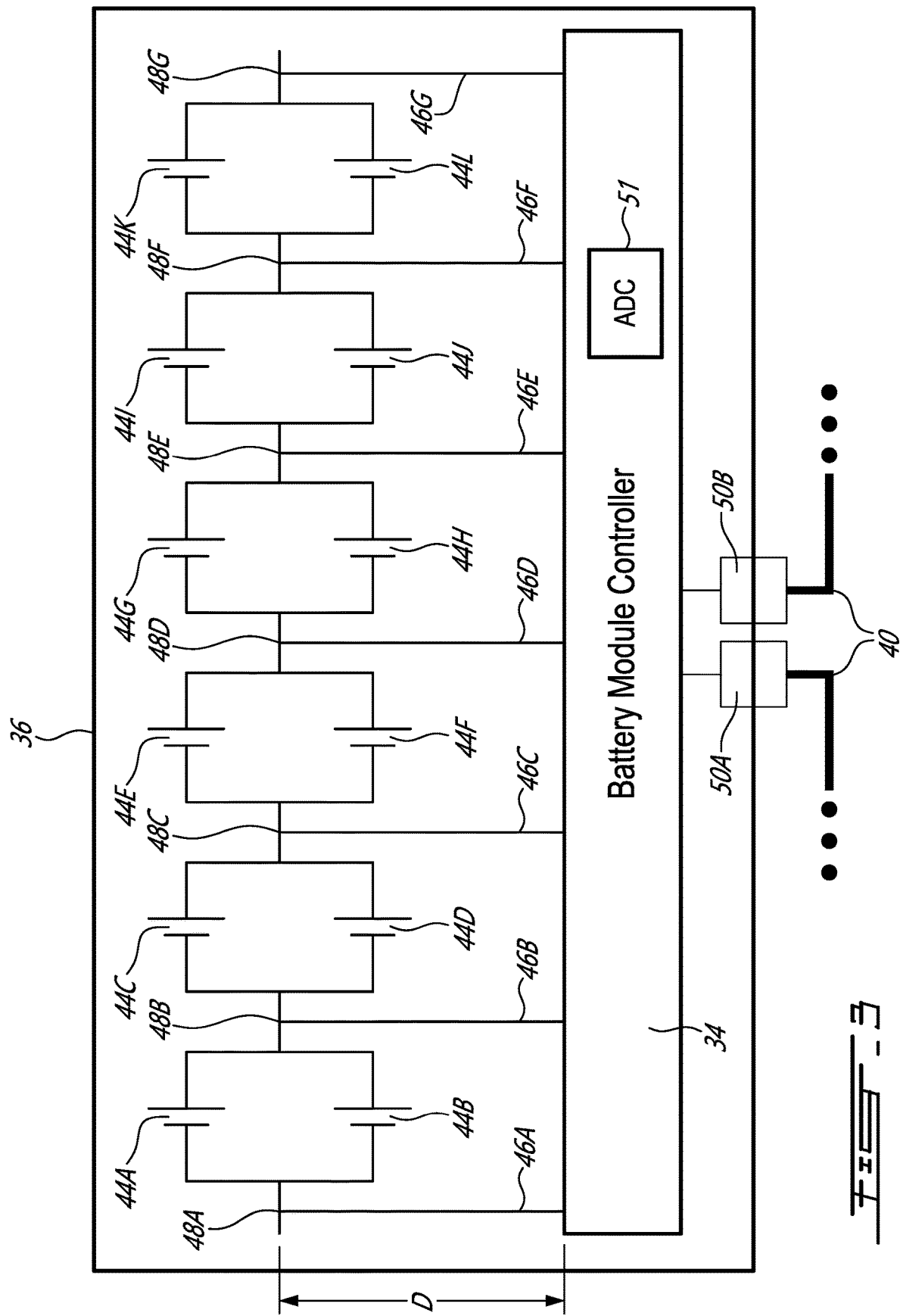
FIG. 3 is a schematic representation of an exemplary topology of a battery module of a battery pack of the vehicle of FIG. 1.

FIG. 3 is a schematic representation of an exemplary topology of battery module 36 of battery pack 26 of vehicle 10. Various embodiments of battery module 36 may include one or more battery cells 44A-44L (referred generically herein as "cells 44"). In some embodiments, battery module 36 may include two or more cells 44. In some embodiments, battery module 36 may include six or more cells 44. In some embodiments, battery module 36 may include twelve or more cells 44.

In the embodiment of FIG. 3, battery module 36 includes six pairs of cells 44 (i.e., a first pair including cells 44A and 44B, a second pair including cells 44C and 44D, a third pair including cells 44E and 44F, a fourth pair including cells 44G and 44H, a fifth pair including cells 44I and 44J, and a sixth pair including cells 44K and 44L) that are connected in series (i.e., daisy chained together). Both cells 44 in each pair of cells 44 are connected in parallel. Battery module 36 may have other topologies in other embodiments. In total, battery module 36 may, for example, include 12 cells 44, outputting twice the current and six times the voltage of a single cell 44.

Battery module 36 may include electric conductors 46A-46G (referred generically herein as "electric conductors 46") extending between module controller 34 and suitable parameter sensing locations 48A-48G (referred generically herein as "sensing locations 48") for measuring voltages and/or temperatures associated with cells 44. Electric conductors 46A-46F may serve as parameter sensing lines. In embodiments where sensing locations 48 are voltage sensing locations, electric conductors 46 may each include (e.g., copper) wires and/or tracks/traces on a printed circuit board. Sensing locations 48 may include tabs (i.e., positive and negative connections) of individual cells 44 or groups of cells 44. Alternatively, sensing locations 48 may include intermediate connectors in electric communication with tabs of cells 44 or of groups of cells 44 of battery module 36 to permit voltage sensing. Groupings of tabs of cells 44 may be configured to correspond to the lowest voltage point (e.g., sensing location 48A) of battery module 36, the highest voltage point (e.g., sensing location 48G) of battery module 36, and each point (e.g., sensing locations 48G-48F) in between the pairs of cells 44 connected in series for a total of seven sensing locations 48.

Electric conductors 46 may establish electric communication between module controller 34 and sensing locations 48 via soldered connections, riveted connections, welded connections, crimped connections, connectors, or other suitable electric connections. Electric conductors 46A and 46B may be used to measure a voltage across the pair of cells 44A and 44B that are electrically connected in parallel. Similarly, electric conductors 46B and 46C may be used to measure a voltage across the pair of cells 44C and 44D that are electrically connected in parallel. Electric conductors 46 may be used to measure voltages across other pairs of cells 44 that are electrically connected in parallel in a similar manner.

In some embodiments, distance D between module controller 34 and sensing locations 48 may be relatively short to promote short lengths of individual electric conductors 46. The short lengths of electric conductors 46 may in turn promote measurement accuracy by reducing signal loss and reducing the risk of noise. In some embodiments, the lengths of individual electric conductors 46 may be substantially the same and within a desired tolerance that provides similar signal losses between electric conductors 46. In some embodiments, the lengths of individual electric conductors 46 may differ but still be within a predetermined range that provides an acceptable level of signal loss or risk of noise. In other words, the lengths of electric conductors 46 may not be uniform across all electric conductors 46. The lengths of electric conductors 46 may be a factor that influences signal loss (e.g., conductor impedance). Other factors that may influence signal loss may include the material type and the cross-sectional area of electric conductors 46 for example.

Distance D may represent a physical (e.g., 2-dimensional or 3-dimensional) straight line distance between module controller 34 and respective sensing locations 48. Distance D may also represent a path length of electric conductor(s) 46 establishing electric communication between module controller 34 and respective sensing locations 48. In various embodiments, distance D for any, one, some or all of sensing locations 48 may be less than or equal to 100 mm. For example, 100 mm may represent a threshold that, below which, the signal loss and/or noise associated with electric conductor(s) 46 is within an acceptable range to provide reliable and accurate measurements. In some embodiments, distance D for any, one, some or all of sensing locations 48 may be between 20 mm and 100 mm. In some embodiments, distance D for any, one, some or all of sensing locations 48 may be between 35 mm and 60 mm. In some embodiments, distance D for any, one, some or all of sensing locations 48 may be between 40 mm and 50 mm. Narrowing the range of values for distance D may reduce the variation in signal loss and noise associated with different sensing locations 48. In reference to FIG. 3, the seven electric conductors 46 may each have a length that is less than or equal to 100 mm. In some embodiments, the seven sensing locations 48 may each be at a straight line distance from module controller 34 that is less than or equal to 100 mm.

Battery module 36 may include one or more connectors 50A, 50B connecting module controller 34 to data bus 40. In the embodiment of FIG. 3, ADC 51 is shown to be incorporated in module controller 34. Since the one or more sensed voltages may be converted from analog signals to digital signals, data communication between module controller 34 and master controller 32 may be established using only two wires irrespective of the number of sensed parameters that are communicated from module controller 34 to master controller 32. Accordingly, connectors 50A, 50B may each be two-wire connectors. In some embodiments, connectors 50A, 50B may be replaced with a single two-wire connector that taps into the two wires of data bus 40. For example, battery modules 36 may be connected to data bus 40 in parallel. The use of connectors 50A, 50B may permit a plurality of module controllers 34 of battery modules 36 to be daisy chained together in series along data bus 40, or connected together in any other suitable fashion. The use of connectors 50A, 50B may also facilitate the modular configuration of BMS 12 where, if one battery module 36 is determined to be faulty, the faulty battery module 36 may be easily replaced (i.e., switched out) by disconnecting the faulty battery module 36 from data bus 40 via connectors 50A, 50B, and connecting an operational (e.g., new) battery module 36 to data bus 40 via the same connectors 50A, 50B in a plug-and-play manner. In other words, connectors 50A, 50B may define a digital communication interface between data bus 40 and module controller 34.

In some embodiments, the digital signals transmitted on data bus 40 may be more resilient to noise and loss as compared to analog signals. Therefore, battery modules 36 may be spaced apart from master controller 32 while still communicating accurate and reliable sensor data. This may allow battery modules 36 to be positioned within vehicle 10 without restrictions due to signal loss and/or noise. Space and weight are at a premium in electric vehicles, and in particular in electric powersports vehicles. Enabling the size and weight associated with battery modules 36 to be distributed within vehicle 10 without restrictions due to signal loss and/or noise may provide design improvements. For example, battery modules 36 may be positioned within vehicle 10 to improve space efficiency and/or to obtain an improved center of mass. Further, the daisy chain configuration of data bus 40 may enable multiple smaller battery modules 36 (e.g., more than four battery modules 36) to be implemented without increasing the number of wires connected to master controller 32. Smaller battery modules 36 may be more easily placed in available space within vehicle 10 to achieve a smaller overall profile of vehicle 10.

FIG. 4 is a perspective view of an exemplary multi-cell battery module 36 of battery pack 26 of vehicle 10. In some embodiments, cells 44 may be battery cells contained in a prismatic (e.g., rectangular) enclosure or housing. The prismatic enclosure may enable battery modules 36 to be stacked or otherwise arranged in a space efficient manner. In some embodiments, cells 44 may be pouch battery cells. In some embodiments, cells 44 may be lithium ion battery cells but it is understood that aspects of the present disclosure are also applicable to other types of battery cells. In some embodiments, battery module 36 may have cooling panels integrated therein for fluid communication with a source of cooling fluid. For example, battery modules 36 may have cooling panels and cells 44 as disclosed in U.S. Patent Publication No. 2021/0135307 A1 (Title: BATTERY COOLING PANEL FOR ELECTRIC VEHICLES), which is incorporated herein by reference.

Battery module 36 may include positive terminal 52A and negative terminal 52B which may be used to electrically connect battery module 36 to other battery modules 36 and/or to electric loads of vehicle 10. Battery module 36 may include removable cover 54 defining part of a housing of battery modules 36. Cover 54 may be covering module controller 34 and optionally other components of battery module 36. Connectors 50A, 50B may be accessible via one or more apertures formed in cover 54.

Battery module 36 may be configured as a modular line-replaceable unit or component that is designed to be replaced as a unit relatively easily and quickly in order to restore an operational condition of battery pack 26. For example, in the event of a malfunction of battery module 36 such as a malfunction of one or more cells 44 or a malfunction of module controller 34, the malfunctioning battery module 36 may be replaced relatively easily through the use of connectors 50A, 50B as explained above, without having to replace other functioning battery modules 36 or other components of battery pack 26, or of BMS 12.

FIG. 5 is a perspective view of an upper portion of battery module 36 shown in FIG. 4 with removable cover 54 thereof removed. Removal of removable cover 54 may expose module controller 34 and tabs 58. Module controller 34 may be disposed on PCB 56, which may be integrated in battery module 36 by being fastened to a structural component (e.g., enclosure, casing, frame) of battery module 36.

FIG. 6 is a top plan view of battery module 36 of FIG. 4 with removable cover 54 being removed from battery module 36. FIG. 6 shows a plan view of front face 57 of battery module 36. FIG. 6 schematically shows module controller 34 being connected to data bus 40 in a daisy chain manner via connectors 50A, 50B. In some embodiments, module controllers 34 could be configured to instead be connected in parallel via connectors 50A, 50B. Module controller 34 may be located on and coupled to a (e.g., front or other) face 57 of battery module 36. For example, module controller 34 may be physically implemented as one or more chips and/or other electronic devices on PCB 56 that is mounted (e.g., attached, fastened and/or soldered) to a same side of battery module 36 as tabs 58 (blades) associated with cells 44 of battery module 36. Module controller 34 may be implemented as a microcontroller having a built-in ADC 51. Alternatively, ADC 51 may be implemented separately of module controller 34. Module controller 34 and/or ADC 51 may be located toward a middle (i.e., central region) of PCB 56 and also relatively centrally of sensing locations 48.

In reference to FIG. 6, sensing locations 48A-48D may correspond to voltage sensing locations, and sensing location 48T may correspond to a temperature sensing location. For example, sensing location 48T may be the location of a thermistor that is electrically connected to module controller 34 via electric conductor(s) 46T. The thermistor may be disposed between battery cells 44 of battery module 36. As illustrated, distance D1 is a straight-line distance between sensing location 48T and module controller 34. Distance D2 is a straight-line distance between sensing location 48B and module controller 34. Distances D1, D2 may instead represent the respective lengths of electrical conductors 46T, 46B. In some embodiments, distances D1 and D2 shown in FIG. 6 may be less than or equal to 100 mm. In some embodiments, distances D1 and D2 may be between 35 mm and 60 mm. In some embodiments, distances D1 and D2 may be between 40 mm and 50 mm. In some embodiments, module controller 34 may be in communication with four or more cells 44 via electric conductors 46. In some embodiments, module controller 34 may be in communication with six to twelve cells 44 via electric conductors 46.

As shown in FIG. 6, some sensing locations 48 may correspond to locations of intermediate connectors in electric communication with tabs 58 of individual cells 44 and/or with tabs 58 associated with groups of cells 44 of battery module 36. Each grouping of tabs 58 may include a combination of tabs 58 from more than one cell 44. Battery module 36 may include any number of groupings of tabs 58, and ADC 51 of module controller 34 may be in communication with any number of groupings of tabs 58.

In order to attach module controller 34, which may have been previously integrated with PCB 56, to face 57 of battery module 36, groupings of tabs 58 may be first electrically connected together via one or more metallic strips known as "V-sense" connectors that may be welded or soldered to applicable tabs 58 to provide suitable sensing locations 48. Sensing locations 48 may correspond to electric connectors that provide electric communication between electric conductors 46 and tabs 58. Such electric connectors may be soldered to the V-sense connectors to physically attach PCB 56 containing module controller 34 to battery module 36. Module controller 34 with integrated ADC 51 may be electrically connected to a plurality of tabs 58 in this manner. Battery module 36 may include seven groupings of tabs 58, and as such, module controller 34 may be in electric communication with tabs 58 via seven electric connections at different sensing locations 48. By way of example, referring to FIG. 3, a grouping of tabs 58 corresponding to sensing location 48A may include tabs from battery cells 44A, 44B, a grouping of tabs 58 corresponding to sensing location 48B may include tabs from battery cells 44A, 44B, 44C, 44D, and so on. Only four voltage sensing locations 48A-48D are identified in FIG. 6 for clarity. In some embodiments, one soldered connection per V-sense connector and electric connector combination is possible at sensing locations 48. In some embodiments, it may be desirable to have two or more soldered connections per V-sense connector and electric connector combination at sensing locations 48 for increased reliability.

When connecting module controller 34 to battery module 36 without damaging circuitry of PCB 56, negative terminal 52B of battery module 36 may first be grounded. This may be done by connecting conductive element 60 (e.g., wire, solder or other suitable electrical conductor) between negative terminal 52B (e.g., the lower left grouping of tabs 58) and ground G. Ground G may be a bolt on front face 57 of battery module 36, among other possibilities. Once negative terminal 52B is grounded, electric connections may be made at sensing locations 48 by, for example, soldering the electric connectors to the V-sense connectors, and soldering the V-sense connectors to appropriate tabs 58. Alternatively, to avoid connecting negative terminal 52B to ground G prior to installation of module controller 34, one or more mechanical fuses (e.g., socket) connectors 62 may be installed on PCB 56. In this manner, there will not be any electric connection between tabs 58 and circuitry of PCB 56 until mechanical fuses are added to PCB 56 via mechanical fuse connectors 62 when ready.

FIG. 7 is a schematic top plan view of multi-cell battery module 36 of FIG. 4 that shows seven voltage sensing locations 48A-48H configured in a similar manner as shown in FIG. 3 except for the lengths of electric conductors 46 being non-uniform. While electric conductors 46 are shown as straight lines in FIG. 7, it should be noted that one or more electric conductors 46 may instead include bends or curves. FIG. 7 shows a plan view of front face 57 of battery module 36. FIG. 7 also shows one temperature sensing location 48T but battery module 36 may include a plurality of temperature sensing locations, which may correspond to a plurality of temperature sensors disposed at different locations within battery module 36. Sensing locations 48 may be disposed at different distances (e.g., D3 and D4) from ADC 51 where such distances may be less than or equal to 100 mm as explained above. Module controller 34 may be mounted to PCB 56 and electric conductors 46 may each include tracks/traces on PCB 56. In some embodiments, sensing locations 48 may be defined on PCB 56. Accordingly, the distances between ADC 51 and sensing locations 48 may be within a boundary of PCB 56, which is integrated into battery module 36.

ADC 51 may convert analog signals indicative of sensed voltages at sensing locations 48 and associated with one or more cells 44 into digital signals indicative of the sensed voltages. Module controller 34 may then communicate the digital signals remotely to master controller 32 via data bus 40.

As shown in FIG. 7, ADC 51 may be positioned substantially centrally on face 57 of battery module 36 and/or substantially centrally of the plurality of sensing locations 48. In some embodiments, ADC 51 is positioned substantially centrally on PCB 56.

FIG. 8 is a perspective view of an exemplary battery pack 26 including a plurality of multi-cell battery modules 36 of FIG. 4 with their covers 54 removed. Battery modules 36 may be arranged in multiple stacks. In some embodiments, battery pack 26 may include eight battery modules 36 daisy chained together along data bus 40. Master controller 32 may be disposed external to (i.e., remotely) of battery pack 26 and still be in digital data communication with individual battery modules 36 via data bus 40. Battery modules 36 may also be electrically daisy chained together via bus bars 64 electrically connecting positive terminals 52A and negative terminals 52B of adjacent battery modules 36 together to electrically connect battery modules 36 in series.

FIG. 9 is a flowchart of a method 100 of performing a function associated with an operation of a traction battery pack of an electric vehicle. Method 100 may be performed using BMS 12 or another BMS. Aspects of method 100 may be combined with other actions described herein. Aspects of BMS 12 and vehicles described herein may be incorporated into method 100. In various embodiments, method 100 may include:

at battery module 36: generating an analog signal indicative of a sensed voltage associated with the one or more battery cells 44 (block 102); and converting the analog signal into a digital signal indicative of the sensed voltage (block 104);

communicating the digital signal indicative of the sensed voltage to master controller 32 external to battery module 36 (block 106); and using master controller 32 to perform the function associated with the operation of the traction battery pack 26 based on the sensed voltage (block 108).

In some embodiments, method 100 may include converting the analog signal into the digital signal at a distance of less than or equal to 100 mm from voltage sensing location 48 used to generate the analog signal.

In some embodiments of method 100, the analog signal may be a first analog signal indicative of a first sensed voltage associated with a first of the one or more battery cells 44. The digital signal may be a first digital signal indicative of the first sensed voltage. Method 100 may include, at battery module 36, generating a second analog signal indicative of a second sensed voltage associated with a second of the one or more battery cells 44. Method 100 may include, at battery module 36, converting the first analog signal into the first digital signal at a first distance of less than or equal to 100 mm from a first voltage sensing location 48A used to generate the first analog signal. Method 100 may include, at battery module 36, converting the second analog signal into a second digital signal indicative of the second sensed voltage at a second distance of less than or equal to 100 mm from a second voltage sensing location 48B used to generate the second analog signal.

In some embodiments, method 100 may include communicating the second digital signal indicative of the second sensed voltage to master controller 32. In some embodiments, method 100 may include, using master controller 32, performing the function associated with the operation of traction battery pack 26 based on the first sensed voltage and the second sensed voltage.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. An electric vehicle comprising:
   two battery modules each comprising a plurality of battery cells;
   a modular distributed battery management system comprising:
     a central battery management controller located remotely from the two battery modules; and
     two integrated battery module controllers connected together in a daisy chain configuration via a data bus, each integrated battery module controller being integrated into a printed circuit board (PCB) that is mounted to a same side of a respective one of the two battery modules as tabs associated with the plurality of battery cells of the respective one of the two battery modules;
   wherein:
     each integrated battery module controller comprises an analog-to-digital converter (ADC) on the PCB and at least one connector for connecting to the tabs of the plurality of battery cells of its respective battery module;
     the at least one connector is configured to generate an analog signal indicative of a sensed voltage associated with at least one battery cell of the plurality of battery cells of its respective battery module;
     the ADC is configured to convert the analog signal to a digital signal indicative of the sensed voltage;
     a distance between the ADC and the at least one connector is between 20-100 mm; and
     the central battery management controller is in digital data communication with each ADC of the two integrated battery module controllers via the data bus to receive each digital signal.

2. The electric vehicle of claim 1, wherein the distance between the ADC and the at least one connector of each integrated battery module controller is between 40-50 mm.

3. The electric vehicle of claim 1, wherein the plurality of battery cells of each battery module comprises greater than 4 battery cells.

4. The electric vehicle of claim 1, wherein the plurality of battery cells of each battery module comprises 12 battery cells.

5. The electric vehicle of claim 4, wherein the at least one connector of each integrated battery module controller comprises 7 connectors, the distance between each of the 7 connectors and the ADC of the integrated battery module controller is between 20-100 mm.

6. The electric vehicle of claim 1, wherein:
   each battery module comprises a thermistor; and
   a distance between each thermistor and the ADC of the respective integrated battery module controller is less than 100 mm.

7. The electric vehicle of claim 1, wherein the plurality of battery cells of each battery module is a plurality of battery pouch cells.

8. The electric vehicle of claim 1, wherein the distance between the ADC and the at least one connector of each integrated battery module controller is between 35-60 mm.

9. The electric vehicle of claim 1, wherein each battery module comprises a prismatic enclosure containing its respective plurality of battery cells.

10. The electric vehicle of claim 9, wherein the battery modules are arranged in a stack.

11. A distributed battery management system for a multi-module traction battery pack of an electric vehicle, the distributed battery management system comprising:
    a first module controller comprising a first analog-to-digital converter (ADC) integrated into a first battery module of the traction battery pack of the electric vehicle, the first ADC converting an analog signal indicative of a first sensed voltage associated with one or more cells of the first battery module into a first digital signal indicative of the first sensed voltage;
    a second module controller comprising a second ADC integrated into a second battery module of the traction battery pack of the electric vehicle, the second ADC converting an analog signal indicative of a second sensed voltage associated with one or more cells of the second battery module into a second digital signal indicative of the second sensed voltage, wherein the first module controller and the second module controller are connected together in a daisy chain configuration via a data bus; and
    a master controller that performs a function associated with the traction battery pack of the electric vehicle based on the first sensed voltage and the second sensed voltage, the master controller being external to the first battery module and the second battery module and in digital data communication with the first ADC and the second ADC via the data bus to receive the first digital signal indicative of the first sensed voltage from the first ADC and receive the second digital signal indicative of the second sensed voltage from the second ADC.

12. The distributed battery management system as defined in claim 11, wherein the data bus comprises a controller area network (CAN) bus.

13. The distributed battery management system as defined in claim 11, comprising a printed circuit board on which the first ADC is installed, the printed circuit board defining an electric conductor establishing electric communication from the first ADC to a voltage sensing location associated with the one or more cells of the first battery module, a length of the electric conductor being less than or equal to 100 mm.

14. The distributed battery management system as defined in claim 11, wherein:
    the one or more cells of the first battery module include a plurality of cells of the first battery module;
    the first ADC is electrically connected to a plurality of voltage sensing locations associated with the plurality of cells of the first battery module; and
    the first ADC converts a plurality of analog signals indicative of respective sensed voltages at the plurality of voltage sensing locations into digital signals indicative of the respective sensed voltages.

15. An electric powersport vehicle comprising the distributed battery management system as defined in claim 11.

16. The distributed battery management system as defined in claim 11, wherein:
   the first module controller is coupled to a face of the first battery module; and
   the second module controller is coupled to a face of the second battery module.

17. The electric vehicle of claim 1, wherein, for each integrated battery module controller:
   the at least one connector is configured to generate a plurality of analog signals indicative of sensed voltages associated with the plurality of battery cells of its respective battery module; and
   the ADC is configured to convert the plurality of analog signals into digital signals indicative of the sensed voltages.

18. The electric vehicle of claim 1, wherein the data bus comprises a controller area network (CAN) bus.

19. The electric vehicle of claim 1, wherein the printed circuit board defines an electric conductor establishing electric communication from the ADC to the at least one connector that is connected to a voltage sensing location associated with the at least one battery cell of the respective battery module, a length of the electric conductor being less than or equal to 100 mm.

20. A distributed battery management system for a multi-module traction battery pack of an electric vehicle, the distributed battery management system comprising:
   a first module controller comprising a first analog-to-digital converter (ADC) integrated into a first printed circuit board (PCB) that is mounted to a first battery module of the traction battery pack, the first PCB being mounted to a same side of the first battery module as first tabs associated with one of more cells of the first battery module, the first ADC converting an analog signal indicative of a first sensed voltage associated with the one or more cells of the first battery module into a first digital signal indicative of the first sensed voltage;
   a second module controller comprising a second ADC integrated into a second PCB that is mounted to a second battery module of the traction battery pack, the second PCB being mounted to a same side of the second battery module as second tabs associated with one or more cells of the second battery module, the second ADC converting an analog signal indicative of a second sensed voltage associated with the one or more cells of the second battery module into a second digital signal indicative of the second sensed voltage, wherein the first module controller and the second module controller are connected together in a daisy chain configuration via a data bus; and
   a master controller that performs a function associated with the traction battery pack of the electric vehicle based on the first sensed voltage and the second sensed voltage, the master controller being external to the first battery module and the second battery module and in digital data communication with the first ADC and the second ADC via the data bus to receive the first digital signal indicative of the first sensed voltage from the first ADC and receive the second digital signal indicative of the second sensed voltage from the second ADC.

21. The distributed battery management system as defined in claim 20, wherein:
   the first PCB is soldered to metallic strips that are welded to the first tabs of the one or more cells of the first battery module; and
   the second PCB is soldered to metallic strips that are welded to the second tabs of the one or more cells of the second battery module.

\* \* \* \* \*